Patented Sept. 30, 1930

1,776,924

UNITED STATES PATENT OFFICE

OTTO NICODEMUS AND WALTER BERNDT, OF HOCHST-ON-THE-MAIN, GERMANY, ASSIGNORS TO GENERAL ANILINE WORKS, INC., OF NEW YORK, N. Y., A CORPORATION OF DELAWARE

CYCLIC HYDROCARBON AND PROCESS FOR PREPARING THE SAME

No Drawing. Application filed April 20, 1926, Serial No. 103,357, and in Germany April 24, 1925.

The present invention relates to a process of preparing cyclic compounds and to new products obtainable thereby.

We have found that when the vapors of certain compounds are conducted at an elevated temperature over highly-porous bodies, such as highly-active charcoal, silica-gel or alumina-gel, new cyclic systems are formed with a good yield and in a continuous and technically rapid way. The compounds to be used as starting materials in our process possess the atom grouping:

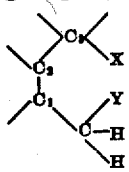

wherein $C_1$ and $C_2$ represent carbon atoms belonging to an aromatic or heterocyclic nucleus, X represents an aliphatic, aromatic, or heterocyclic residue in which at least one carbon atom which is in $\beta$-position to the carbon atom marked $C_2$ contains a hydrogen atom attached to it, and Y represents hydrogen, chlorine, or a hydrocarbon residue. For example, they may be ketones possessing the atom grouping:

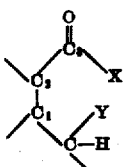

wherein $C_1$, $C_2$, X and Y represent the same as in the above formula, or they may be carbinols possessing the atom grouping:

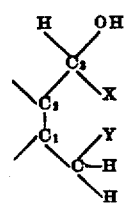

or methane derivatives and so on.

It is advantageous to operate in presence of oxidizing media, which can only be omitted, if ketones are utilized for the formation of the cyclic chains. When using other starting materials the presence of oxygen is necessary and for this purpose there are added to the highly-active substances some further suitable catalyzers which, like iron oxides, manganese oxides, cobalt oxides, vanadium oxides, act as catalytic oxygen carriers.

Thus there may be prepared by our new process for instance $\beta$-methylanthracene from benzoyl-m-xylene in a continuous way with a good yield and in excellent purity.

The reaction takes place according to the following scheme:

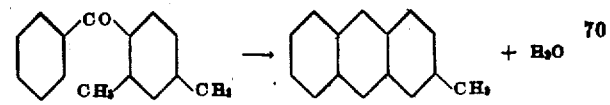

Furthermore, by using different ketones, a great variety of hydrocarbons related to anthracene can be obtained.

Thus, the ketones may be of symmetric or asymmetric structure, representing derivatives or substitution products of benzophenone or also of polynuclear aromatic ketones (naphthalene). Likewise di-ketones, such as, for instance, isophthaloxyl-xylene, are capable of forming closed chains provided that all these ketones contain a methyl- or methylene group in ortho position to the carbonyl group.

However, the reaction is not restricted to the formation of hexagonal rings, but the use of mixed aliphatic-aromatic ketones also permits the formation of pentagonal rings. If, for instance, the vapours of aceto-m-xylene are conducted over heated highly-active charcoal, methylinden is obtained with elimination of water, this being a body which was heretofore not known in a pure state. According to the character of the ketones used, it may be advantageous to add to the highly-porous bodies some further catalytically acting substances. In some cases it may also be advantageous to work under reduced or increased pressure.

We have found that furthermore all secondary and tertiary aromatic or mixed alcohols, containing a methyl- or methylene group in ortho position to the carbinol group, are capable of forming cyclic chains. In this connection it has been observed that secondary reactions which are caused by the reducing action of the hydrogen produced during the operation are advantageously avoided by conducting the alcohol vapours, mixed with oxygen—for instance with air— or with oxygen-yielding agents, such as nitro bodies, over the highly-porous bodies to which, if desired, some further oxygen carrying catalyzers may be added. For instance:

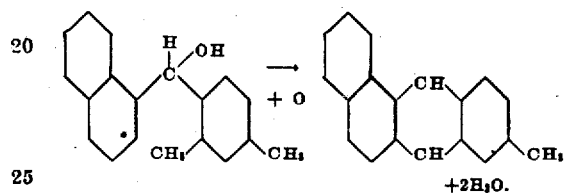

The closing of the chain takes place in this case with simultaneous formation of 2 mol. of water and it is immaterial whether the alcohol group is free or etherified or esterified. In every case, the formation of the ring takes place with elimination of the ether group or ester group in form of alcohol or an acid, provided, of course, that an ortho-position to the alcohol group is free which renders possible the formation of the cyclic chain.

We have moreover found that it is not necessary to start from ketones or alcohols containing a methyl group in ortho position, but that the di- or triarylmethanes containing a methyl or methylene group in ortho position are capable of reacting in the same manner. Also in this case the reaction in question can be generally applied including the derivatives and substitution products. As contact substances may be used the highly-porous bodies above referred to; it is only preferable to work in presence of an oxidizing medium and, if required, to add some further oxygen carrier to the highly-porous bodies.

The reaction takes place according to the scheme:

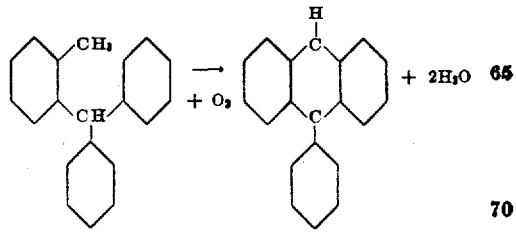

Furthermore we found that the new process can as well be applied to heterocyclic compounds. It is thus possible to produce cyclic compounds which were mostly hitherto unknown and some of which possess particularly valuable properties owing to their heterocyclic character. For preparing them, there are used such heterocyclic ketones, carbinoles or methane derivatives, as contain a methyl- or methylene group in ortho-position to the ketone-carbinol- or methylene group. The formation of the ring is, in case of need, effected in presence of oxygen or air by the action of the contact substances above referred to, among which the active charcoal has proved to be particularly suitable for the purpose. Also in the present case the reaction occurs with elimination of water, for instance according to the equation:

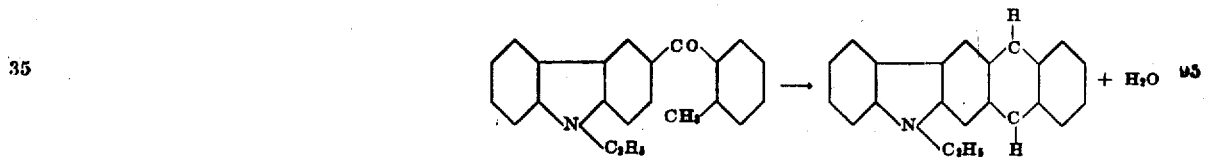

The following examples serve to illustrate our invention and their wide range of application:—

(1) Through a copper contact-vessel, charged with a highly-active charcoal which is intermixed with manganic cobaltic oxide, are conducted at 400° C. the vapours of m-xylylphenylmethane M. P. 305° C., mixed with an excess of air. The reaction product issuing from the catalyst is condensed, separated from the water which has formed, filtered by suction and recrystallized from glacial acetic acid. Thus 40% of the starting material is converted into β-methylanthracene M. P. 201° C., the unaltered xylylphenylmethane being returned to the reaction vessel.

(2) Over a contact-substance consisting of highly active charcoal (activated with phosphoric acid) and charged with copper-cobaltic oxide, are conducted at 400° C. the vapours of di-p-xylylcarbinol M. P. 131° C. mixed with air. After having left the contact furnace the reaction product is condensed in a receiver and then separated from the water which has formed and recrystallized from toluene. Thus there is obtained 1-4-7-trimethylanthracene M. P. 226° C. in the amount of 50% of the theory. The unaltered starting material, after the solvent has been distilled therefrom, is returned to the furnace. The reaction occurs according to the following equation:

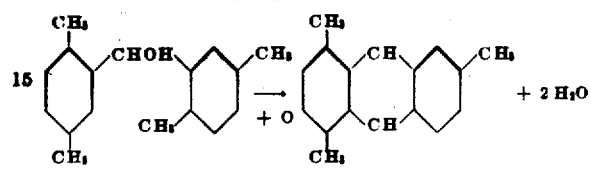

(3) Ortho-toluyl-5-acenaphthene is reduced and the carbinol, which melts at 145° C. and dissolves in sulfuric acid with an indigo-blue tint, is distilled mixed with air under reduced pressure over a contact made of highly active charcoal and heated to 320–340° C. Having regard to the fact that the acenaphthene derivative is highly decomposable, care must be taken that the passage of the gas through the reaction zone takes place rapidly. The product of the reaction is obtained as a solid cake which is dissolved hot in ligroine of a high boiling point. On cooling, the anthracene of the acenaphthene separates as light yellow leaflets which melt at 191° C. and dissolve in sulfuric acid with a reddish violet color of a strong fluorescence. The closing of the ring occurs according to the following scheme:

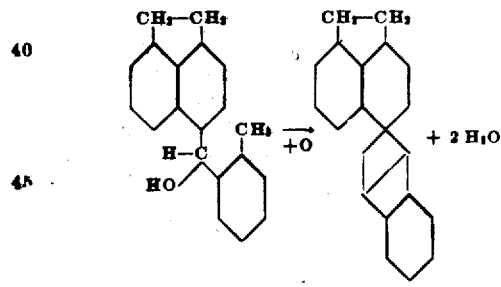

The yield amounts to 35% of the theory. The unaltered parent material is returned to the contact furnace. Analysis of the above mentioned anthracene showed:

94.17% C.   5.78% H.
against 94.4 % C.   6.6 % H. as previously calculated.

(4) Over a catalyst, consisting of highly active charcoal heated to 400° C., are conducted the vapours of m-xylenecarbinol-acetate mixed with air during which operation the ester effects the closing of the ring to form the β-methylanthracene with elimination of acetic acid and water. By recrystallizing the reaction product from glacial acetic acid the β-methylanthracene is obtained in a pure state and with a yield of 30%, the mother liquors containing benzoyl-m-xylene in the amount of 50% of the ester employed.

(5) Into a copper contact-pipe, charged with 600 ccm. of active charcoal-obtained from so-called crude-coke by activation with water-vapour-, benzoyl-m-xylene is introduced at 380–400° C. drop by drop in such a manner that in the course of an hour 100 g. of the benzoyl-m-xylene pass the catalyst. The vapours emanating from the pipe become condensed into a crystal cake and water. After having drawn off the water there is obtained from 1270 g. of the ketone used 1090 g. of a crystal cake which constitutes a mixture of β-methylanthracene and unaltered ketone. By squeezing the cake, 500 g. of benzoyl-m-xylene are recovered, which are immediately returned into the contact pipe. The crystals remaining in the filter-press are mixed and stirred for a short time with alcohol or benzol, again pressed off and they yield 540 g. of β-methylanthracene of melting point 201° C. The reaction proceeds very easily and the contact cylinder employed remains active for a long time, provided that the ketone contains no substances splitting off acids. The β-methylanthracene can be easily converted in the usual manner by oxidation with nitrosyl-sulfuric acid into the corresponding β-methylanthraquinone.

(6) Over silica-gel, which has been heated in a pipe made of quartz to 420° C., vapours of ortho-toluyl-naphthalene are conducted. The vapours emanating from the catalyst become condensed into a sublimate showing a beautiful yellow-green fluorescence, which is freed from the admixed parent material by recrystallization from glacial acetic acid. Thus, 1,2-benzanthracene of melting point 167° C. is obtained from which its picrate, melting at 132° C., can be easily prepared. The yield of the product is good and the contact substance remains efficacious for a considerable time. The reaction occurs according to the equation:—

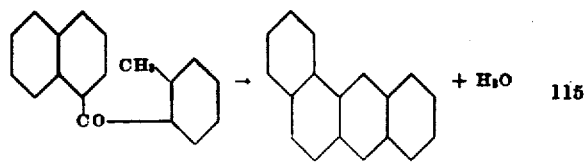

(7) 2-methylnaphthenone, of melting point 230–235° C.—prepared by the action of α-naphthoic acid chloride upon β-methylnaphthalene—is slowly distilled at a pressure of about 5 mm. through a contact (of the kind described in Example 5) at 400° C. while simultaneously evacuating the apparatus. The product of the reaction solidifies in a receiver placed at the rear part of the contact furnace into a yellow crystal cake, which, besides unaltered parent-material, contains dinaphthanthracene in the amount of 50% of the ketone used. By recrystallization from benzol, the dinaphthanthracene is obtained in a pure state in the form of greenish-yellow laminae of melting point 250° C., whereas its picrate—which crystallizes in brownish-orange needles—melts at 210° C. It must be assumed that reaction takes place according to the following scheme and that therefore the constitution of the dinaphthanthracene is the following:

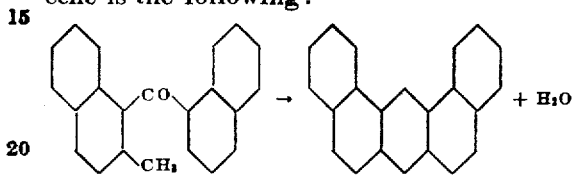

(8) 2-xylyl-5-xyloyl-pyridine is evaporated in vacuo in a weak current of air and then conducted over active charcoal heated to 400 to 420° C. The receiver contains a mixture of the compound of the following formula:

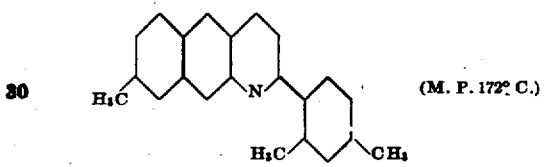

besides unaltered parent material and other by-products. The former is obtained by recrystallization from methyl alcohol or petroleum ether in a pure state.

(9) Ortho-toluyldiphenylene sulfide, obtained by subjecting diphenylenesulfide to reaction with ortho-toluyl chloride and $AlCl_3$, is evaporated and conducted, under ordinary or reduced pressure, at 400–450° C. over highly-porous charcoal. The closing of the ring is thereby effected very easily. The condensate is a solid mass, which when treated with cold ether, is separated into the unaltered ketone, which is dissolved in the ether whereas the yellowish green anthracene derivative remains. The yield is up to 60%. Recrystallized from glacial acetic acid it constitutes a yellow body showing a green fluorescence which melts at 249–250° C. Its solution in concentrated sulfuric acid has a reddish-violet color. The reaction occurs according to the following equation:

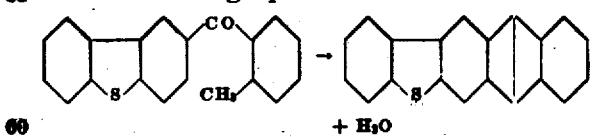

(10) p-chlorbenzoyl-m-xylene is distilled over a contact (of the kind described in Example 3) at 400° C. while evacuating the apparatus in such a manner that in the course of an hour 80–100 g. of the material passes the contact. The product of the reaction forms a white crystal cake which constitutes a mixture of unaltered parent material with 2-methylanthracene and 2-chloro-7-methylanthracene. By repeated recrystallization from nitro-benzene the 2-chloro-7-methylanthracene of melting point 270° C. is obtained. The reaction proceeds according to the equation:

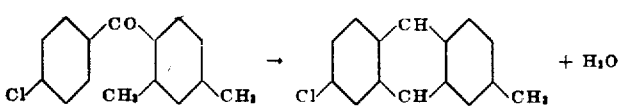

We claim:

1. The process which comprises conducting over highly-porous bodies having highly active properties and the property of extensively absorbing gases and vapors, at an elevated temperature sufficient to cause a ring-closing but below a carbonizing temperature, the vapors of a compound possessing the atom grouping:

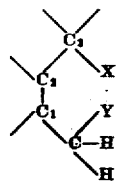

wherein $C_1$ and $C_2$ represent carbon atoms belonging to an aromatic or heterocyclic nucleus, X represents an aliphatic, aromatic, or heterocyclic residue, in which at least one carbon atom which is in $\beta$-position to the carbon atom marked $C_2$ contains a hydrogen atom attached to it, and Y represents hydrogen, chlorine or a hydrocarbon residue.

2. The process which comprises conducting over highly-porous bodies having highly active properties and the property of extensively absorbing gases and vapors, at an elevated temperature sufficient to cause a ring-closing but below a carbonizing temperature, the vapors of a compound possessing the atom grouping:

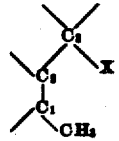

wherein $C_1$ and $C_2$ represent carbon atoms belonging to an aromatic or heterocyclic nucleus and X represents an aliphatic, aromatic, or heterocyclic residue in which at least one carbon atom which is in $\beta$-position to the carbon atom marked $C_2$ contains a hydrogen atom attached to it.

3. The process which comprises conducting over highly-porous bodies having highly active properties and the property of extensively absorbing gases and vapors, at an elevated temperature sufficient to cause a ring-closing but below a carbonizing temperature, the vapors of a compound possessing the atom grouping:

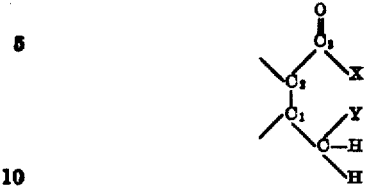

wherein $C_1$ and $C_2$ represent carbon atoms belonging to an aromatic or heterocyclic nucleus, X represents an aliphatic, aromatic, or heterocyclic residue in which at least one carbon atom which is in $\beta$-position to the carbon atom marked $C_3$ contains a hydrogen atom attached to it, and Y represents hydrogen, chlorine, or a hydrocarbon residue.

4. The process which comprises conducting over highly-porous bodies having highly active properties and the property of extensively absorbing gases and vapors, at an elevated temperature sufficient to cause a ring-closing but below a carbonizing temperature, the vapors of a compound possessing the atom grouping:

wherein $C_1$ and $C_2$ represent carbon atoms belonging to an aromatic or heterocyclic nucleus and X represents an aliphatic, aromatic, or heterocyclic hydrocarbon residue in which at least one carbon atom which is in $\beta$-position to the carbon atom marked $C_3$ contains a hydrogen atom attached to it.

5. The process which comprises conducting over highly-porous bodies having highly active properties and the property of extensively absorbing gases and vapors, at an elevated temperature sufficient to cause a ring-closing but below a carbonizing temperature, the vapors of a compound possessing the atom grouping:

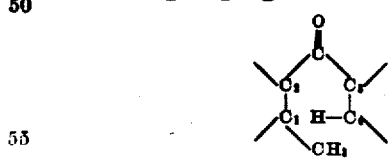

wherein $C_1$ and $C_2$ represent carbon atoms belonging to a nucleus of the group including the benzene and naphthalene series and $C_3$ and $C_4$ represent carbon atoms belonging to an aromatic or heterocyclic nucleus.

6. The process which comprises conducting over highly-porous bodies having highly active properties and the property of extensively absorbing gases and vapors, at an elevated temperature sufficient to cause a ring-closing but below a carbonizing temperature, the vapors of a compound having the general formula:

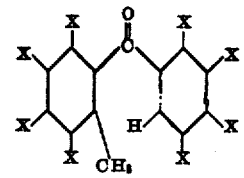

wherein X represents hydrogen or a monovalent substituent.

7. The process which comprises conducting over highly porous bodies having highly active properties and the property of extensively absorbing gases and vapors, at a temperature between about 320° C. and about 450° C., the vapors of a compound possessing the atom grouping:

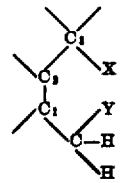

wherein $C_1$ and $C_2$ represent carbon atoms belonging to an aromatic or heterocyclic nucleus, X represents an aliphatic, aromatic, or heterocyclic residue, in which at least one carbon atom which is in $\beta$-position to the carbon atom marked $C_3$ contains a hydrogen atom attached to it, and Y represents hydrogen, chlorine or a hydrocarbon residue.

8. The process which comprises conducting over highly porous bodies having highly active properties and the property of extensively absorbing gases and vapors, at a temperature between about 320° C. and about 450° C., the vapors of a compound possessing the atom grouping:

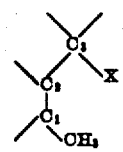

wherein $C_1$ and $C_2$ represent carbon atoms belonging to an aromatic or heterocyclic nucleus and X represents an aliphatic, aromatic, or heterocyclic residue in which at least one carbon atom which is in $\beta$-position to the carbon atom marked $C_3$ contains a hydrogen atom attached to it.

9. The process which comprises conducting over highly porous bodies having highly active properties and the property of extensively absorbing gases and vapors, at a temperature between about 320° C. and about 450° C., the vapors of a compound possessing the atom grouping:

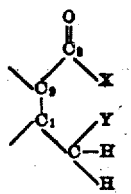

wherein $C_1$ and $C_2$ represent carbon atoms belonging to an aromatic or heterocyclic nucleus, X represents an aliphatic, aromatic, or heterocyclic residue in which at least one carbon atom which is in β-position to the carbon atom marked $C_3$ contains a hydrogen atom attached to it, and Y represents hydrogen, chlorine, or a hydrocarbon residue.

10. The process which comprises conducting over highly porous bodies having highly active properties and the property of extensively absorbing gases and vapors, at a temperature between about 320° C. and about 450° C., the vapors of a compound possessing the atom grouping:

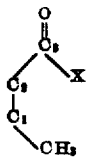

wherein $C_1$ and $C_2$ represent carbon atoms belonging to an aromatic or heterocyclic nucleus and X represents an aliphatic, aromatic, or heterocyclic residue in which at least one carbon atom which is in β-position to the carbon atom marked $C_3$ contains a hydrogen atom attached to it.

11. The process which comprises conducting over highly porous bodies having highly active properties and the property of extensively absorbing gases and vapors, at a temperature between about 320° C. and about 450° C., the vapors of a compound possessing the atom grouping:

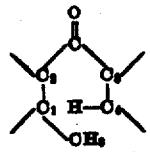

wherein $C_1$ and $C_2$ represent carbon atoms belonging to a nucleus of the group including the benzene and naphthalene series and $C_3$ and $C_4$ represent carbon atoms belonging to an aromatic or heterocyclic nucleus.

12. The process which comprises conducting over highly porous bodies having highly active properties and the property of extensively absorbing gases and vapors, at a temperature between about 320° C. and about 450° C., the vapors of a compound having the general formula:

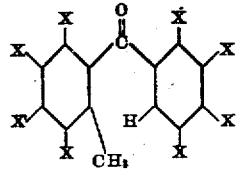

wherein X represents hydrogen or a monovalent substituent.

13. As new products, cyclic compounds which are produced by closing the ring of compounds of the formula:

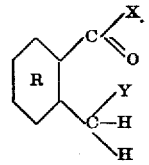

wherein the symbol may signify the following: R=an acenaphthene or phenanthrene or heterocyclic, substituted or non-substituted residue, Y=hydrogen or chlorine or a hydrocarbon residue, X=an aliphatic or aromatic or heterocyclic residue.

In testimony whereof, we affix our signatures.

Dr. OTTO NICODEMUS.
Dr. WALTER BERNDT.

CERTIFICATE OF CORRECTION.

Patent No. 1,776,924.                                  Granted September 30, 1930, to

OTTO NICODEMUS ET AL.

It is hereby certified that error appears in the printed specification of the above numbered patent requiring correction as follows: Page 5, line 38, claim 4, strike out the word "hydrocarbon"; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.

Certificate of Correction

Patent No. 1,776,924.                                  Granted September 30, 1930, to

OTTO NICODEMUS ET AL.

It is hereby certified that error appears in the printed specification of the above-numbered patent requiring correction as follows: Page 3, between lines 38 and 50, strike out the right-hand formula and insert instead and that the said Letters Patent should be read with this correction therein that the same may conform to the record of the case in the Patent Office.

Signed and sealed this 3d day of February, A. D. 1931.

[SEAL.]

M. J. MOORE,
*Acting Commissioner of Patents.*

CERTIFICATE OF CORRECTION.

Patent No. 1,776,924.  Granted September 30, 1930, to

OTTO NICODEMUS ET AL.

It is hereby certified that error appears in the printed specification of the above numbered patent requiring correction as follows: Page 5, line 38, claim 4, strike out the word "hydrocarbon"; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.